United States Patent [19]

Lawrenz et al.

[11] Patent Number: 4,939,216

[45] Date of Patent: Jul. 3, 1990

[54] HEAT-CURABLE COATING MATERIAL HAVING A LOW BAKING TEMPERATURE

[75] Inventors: Dirk Lawrenz, Ditzirgen; Hans Schupp, Worms; Thomas Schwerzel, Ludwigshafen, all of Fed. Rep. of Germany

[73] Assignee: BASF Lacke+ Farben Aktengesellschaft, Muenster, Fed. Rep. of Germany

[21] Appl. No.: 378,841

[22] Filed: Jul. 12, 1989

[30] Foreign Application Priority Data

Jul. 20, 1988 [DE] Fed. Rep. of Germany ....... 3824552

[51] Int. Cl.$^5$ ............................................. C08F 283/04
[52] U.S. Cl. ...................................... 525/454; 523/404; 523/414; 523/415; 524/901; 525/456; 525/528
[58] Field of Search ........................ 525/454, 456, 528; 524/901; 523/414, 415, 404

[56] References Cited

U.S. PATENT DOCUMENTS 4,143,220  3/1979  Müller et al. ..................... 521/129
4,721,758  1/1988  Schupp et al. ..................... 525/490

OTHER PUBLICATIONS

"Makromolekulare Chemie" Band 57, 1962.

*Primary Examiner*—Theodore E. Pertilla
*Attorney, Agent, or Firm*—Keil & Weinkauf

[57] ABSTRACT

A heat-curable coating material for cathodic electrocoating is water-dilutable on protonation with an acid and contains
  (A) from 50 to 95% by weight of a polymer, polycondensate or polyadduct containing primary and/or secondary amino groups, as a binder, and
  (B) from 5 to 50% by weight of a crosslinking agent obtainable by reacting
    (a) a polyurethane with
    (b) formaldehyde or a formaldehyde-donating compound and
    (c) one or more secondary aliphatic amines.

7 Claims, No Drawings

HEAT-CURABLE COATING MATERIAL HAVING A LOW BAKING TEMPERATURE

The present invention relates to heat-curable coating materials for cathodic electrocoating, containing a binder (A) having primary and/or second amino groups and a crosslinking agent (B) which is obtainable by reacting a polyurethane with formaldehyde and a secondary aliphatic amine.

Coating materials for cathodic electrocoating which consist of a combination of an amino-containing binder and a crosslinking agent based on reaction products of polyphenol, formaldehyde and a secondary amine are known. For example, U.S. Pat. No. 4,721,758 to Schupp et al. (corresponds to No. EP-A-167 029) describes a binder for cathodic electrocoating, consisting of a mixture or precondensate of a polymer (A) containing primary and/or secondary amino groups and a crosslinking agent (B) based on a phenolic Mannich base, prepared from (a) one or more polynuclear polyphenols,
(b) formaldehyde or a formaldehyde-donating compound and
(c) one or more secondary aliphatic amines.

The coating films produced generally afford good corrosion protection and exhibit good leveling properties after baking. However, the temperatures required for baking are very high, which is a substantial disadvantage because of the energy consumption during the baking process. Reaction products of carboxamides or urethanes with aldehydes and secondary amines are described in Makromol. Chem. 57 (1962), 45. No. DE-A-22 23 427 describes the use of specific types of these reaction products for the preparation of polyurethane foams.

It is an object of the present invention to provide coating materials which can be baked at low temperatures.

Surprisingly, the baking temperature of coating materials which contain reaction products of polyurethane, formaldehyde and a secondary amine as crosslinking agents can be substantially reduced.

We have found that this object is achieved by a heat-curable coating material for cathodic electrocoating, which material is water-dilutable on protonation with an acid and contains (A) from 50 to 95% by weight of a polymer, polycondensate or polyadduct containing primary and/or secondary amino groups, as a binder, and
(B) from 5 to 50% by weight of a crosslinking agent obtainable by reacting
  (a) a polyurethane with
  (b) formaldehyde or a formaldehyde-donating compound and
  (c) one or more secondary aliphatic amines.

Regarding the individual components, the following may be stated.

Component (A) is generally known and is described adequately in U.S. Pat. No. 4,721,758. It is used in an amount of from 50 to 95, preferably from 60 to 80, % by weight.

The polyurethanes (a) used for the preparation of component (B) are obtainable by reacting polyisocyanates having a functionality of not less than 2 with monofunctional aliphatic or aromatic alcohols. The use or concomitant use of alcohols having higher functionalities is also possible. This gives polyurethanes having higher molecular weights. Examples of suitable polyisocyanates are toluylene diisocyanate, hexamethylene diisocyanate, isophorone diisocyanate, trimethylhexamethylene diisocyanate, 4,4'-diphenylmethane diisocyanate, xylylene diisocyanate, trimerized hexamethylene diisocyanate, trimerized isophorone diisocyanate and derivatives of aromatic diisocyanates which are hydrogenated in the nucleus. It is also possible to prepare suitable polyisocyanates by reacting polyols or polyamines with low molecular weight polyisocyanates. Mixtures of polyisocyanates and/or mixtures of poly- and monoisocyanates can also be used.

Examples of suitable aliphatic alcohols are $C_1$–$C_{12}$-alkanols, such as methanol, ethanol, propanol, isopropanol, isobutanol and cyclohexanol.

Examples of suitable aromatic alcohols are benzyl alcohol, phenol and substituted phenols.

Preferably used polyurethanes are reaction products of trimerized hexamethylene diisocyanate or toluylene diisocyanate with aromatic alcohols such as phenol or substituted phenols.

Components (b) and (c) have been described in U.S. Pat. No. 4,721,758. In order to obtain crosslinkable compounds, the amino component (c) must have a certain degree of volatility and therefore must not have too high a molecular weight.

The reaction of the polyurethanes with formaldehyde or with a formaldehyde-donating compound and with the dialkylamine is carried out under the same conditions as those described in U.S. Pat. No. 4,721,758 for the reaction of polyphenols with formaldehyde and dialkylamines.

From 0.5 to 1.1, preferably from 0.8 to 1.0, equivalents of (b) and from 0.5 to 1.1, preferably from 0.8 to 1.0, equivalents of (c) are used per equivalent of urethane groups in the polyurethane (a).

Component (B) is used in amounts of from 5 to 50, preferably from 20 to 40, % by weight, the sum of the percentages used under (A) and (B) being 100.

Components (A) and (B) can also be partially reacted.

In addition to the components (A) and (B), further substances, such as pigments, coating assistants, solvents and curing catalysts, may be added. The coating materials prepared in this manner can also be applied to substrates such as wood, plastic or metal by a conventional method. For electrocoating, the novel coating material containing the stated additives is converted into a water-soluble form by protonation with an acid. Preferably used acids are carboxylic acids, such as formic acid, acetic acid or lactic acid, but inorganic acids, such as phosphoric acid, may also be used.

For cathodic electrocoating, the solids content of the electrocoating bath is generally brought to 5–30% by weight. Deposition is usually effected at from 15° to 40° C. for from 0.5 to 5 minutes and at a pH of from 4.0 to 8.5, preferably at the neutral point, at voltages of from 50 to 500 volt. The electrically conductive article to be coated is made the cathode. The deposited film is cured at from 120° to 160° C. for about 20 minutes.

EXAMPLES

Preparation of the novel crosslinking agent B

Crosslinking agent B1

252 g of trimerized hexamethylene diisocyanate (1.5 equivalents of NCO) were stirred with 141 g of phenol (1.5 moles) in 151 g of toluene at 80° C., using 0.4 g of dibutyltin dilaurate as a catalyst, until the conversion of the isocyanate groups was complete, which takes about 2 hours. Thereafter, 46 g of paraformaldehyde (1.5 moles) and 194 g of dibutylamine (1.5 moles) were added and stirring was continued for 2 hours at 80° C. After this time, the pressure was slightly reduced and the resulting water of reaction was distilled off azeotropically at 80° C. The resulting crosslinking agent had a solids content of about 75% by weight.

Crosslinking agent B2

252 g of trimerized hexamethylene diisocyanate (1.5 equivalents of NCO) were stirred with 186 g of 1-hydroxy-4-methoxybenzene (1.5 moles) in 16 g of toluene at 80° C., using 0.9 g of dibutyltin dilaurate as a catalyst, until the conversion of the isocyanate groups was complete, which takes about 2 hours. Thereafter, 46 g of paraformaldehyde (1.5 moles) and 194 g of dibutylamine (1.5 moles) were added and stirring was continued for 2 hours at 80° C. After this time, the pressure was slightly reduced and the resulting water of reaction was distilled off azeotropically at 80° C. The resulting crosslinking agent had a solids content of about 80% by weight.

Crosslinking agent B3

252 g of trimerized hexamethylene diisocyanate (1.5 equivalents of NCO) were stirred with 193 g of 1-chloro-4-hydroxybenzene (1.5 moles) in 165 g of toluene at 80° C., using 0.9 g of dibutyltin dilaurate as a catalyst, until the conversion of the isocyanate groups was complete, which takes about 2 hours. Thereafter, 46 g of paraformaldehyde (1.5 moles) and 194 g of dibutylamine (1.5 moles) were added and stirring was continued for 2 hours at 80° C. After this time, the pressure was slightly reduced and the resulting water of reaction was distilled off azeotropically at 80° C. The resulting crosslinking agent had a solids content of about 80% by weight.

Crosslinking agent B4

252 g of trimerized hexamethylene diisocyanate (1.5 equivalents of NCO) were stirred with 111 g of isobutanol (1.5 moles) in 144 g of toluene at 80° C., using 0.4 g of dibutyltin dilaurate as a catalyst, until the conversion of the isocyanate groups was complete, which takes about 2 hours. Thereafter, 46 g of paraformaldehyde (1.5 moles) and 194 g of dibutylamine (1.5 moles) were added and stirring was continued for 2 hours at 80° C. After this time, the pressure was slightly reduced and the resulting water of reaction was distilled off azeotropically at 80° C. The resulting crosslinking agent had a solids content of about 80% by weight.

Crosslinking agent B5

252 g of trimerized hexamethylene diisocyanate (1.5 equivalents of NCO) were stirred with 165 g of cyclohexanol (1.5 moles) in 175 g of toluene at 80° C., using 0.9 g of dibutyltin dilaurate as a catalyst, until the conversion of the isocyanate groups was complete, which takes about 2 hours. Thereafter, 46 g of paraformaldehyde (1.5 moles) and 194 g of dibutylamine (1.5 moles) were added and stirring was continued for 2 hours at 80° C. After this time, the pressure was slightly reduced and the resulting water of reaction was distilled off azeotropically at 80° C. The resulting crosslinking agent had a solids content of about 80% by weight.

Crosslinking agent B6

252 g of trimerized hexamethylene diisocyanate (1.5 equivalents of NCO) were stirred with 162 g of benzyl alcohol (1.5 moles) in 157 g of toluene at 80° C., using 0.9 g of dibutyltin dilaurate as a catalyst, until the conversion of the isocyanate groups was complete, which takes about 2 hours. Thereafter, 46 g of paraformaldehyde (1.5 moles) and 194 g of dibutylamine (1.5 moles) were added and stirring was continued for 2 hours at 80° C. After this time, the pressure was slightly reduced and the resulting water of reaction was distilled off azeotropically at 80° C. The resulting crosslinking agent had a solids content of about 80% by weight.

Crosslinking agent B7

131 g of toluylene diisocyanate (1.5 equivalents of NCO) were stirred with 141 g of phenol (1.5 moles) in 120 g of toluene at 80° C., using 0.5 g of dibutyltin dilaurate as a catalyst, until the conversion of the isocyanate groups was complete, which takes about 2 hours. Thereafter, 46 g of paraformaldehyde (1.5 moles) and 194 g of dibutylamine (1.5 moles) were added and stirring was continued for 2 hours at 80° C. After this time, the pressure was slightly reduced and the resulting water of reaction was distilled off azeotropically at 80° C. The resulting crosslinking agent had a solids content of about 80% by weight.

A crosslinking agent according to U.S. Pat. No. 4,721,758, Component B5, was prepared as a Comparative Example.

Component A The NH-containing coating resin described in U.S. Pat. No. 4,721,758, Component A1 was a suitable coating resin and was used.

EXAMPLES 1 TO 8

The Examples which follow illustrate the use of the novel binder compositions in cathodic electrocoating finishes.

A pigment paste was first prepared by milling
110 parts of component (A1),
36 parts of ethylene glycol monobutyl ether,
3 parts of acetic acid,
145 parts of rutile,
35 parts of aluminum silicate,
10 parts of lead silicate,
2.5 parts of carbon black and
170 parts of water
in a ball mill to a particle size of <7 μm.

Component (A) was mixed with component (B) in an amount such that the resulting mixture contained 137 g of solids in a mixing ratio of 70% of component (A) and 30% of component (B). 4.1 g of acetic acid were added and a dispersion was prepared with 300 g of demineralized water, while stirring. Thereafter, 139 g of the above-mentioned pigment paste were added and the mixture was made up to 1,000 g with demineralized water. The electrocoating baths thus prepared were stirred for 2 days at 27° C. Thereafter, a metal sheet which had been made the cathode was coated at 280 volt for 2 minutes and then baked for 20 minutes at the temperatures shown in the Table. The Table below shows the results.

TABLE

| | Technical testing of the baked coating films | | |
|---|---|---|---|
| Examples | Crosslinking agent | Baking temperature [°C.] | Solvent resistance |
| 1 | B 1 | 120 | 2 |
| | | 140 | 1 |
| | | 160 | 1 |
| 2 | B 2 | 140 | 2 |
| | | 160 | 1 |
| 3 | B 3 | 140 | 2 |
| | | 160 | 1 |
| 4 | B 4 | 160 | 1 |
| 5 | B 5 | 160 | 3 |
| 6 | B 6 | 160 | 3 |

TABLE-continued

Technical testing of the baked coating films

| Examples | Crosslinking agent | Baking temperature [°C] | Solvent resistance |
|---|---|---|---|
| 7 | B 7 | 120 | 1 |
|   |     | 140 | 1 |
|   |     | 160 | 1 |
| 8 (Comparison) | U.S. Pat. No. 4,721,758 (B 5) | 140 | 3 |
|   |     | 160 | 2 |

Rating:
Solvent resistance:
Rating 1 = not attacked
Rating 2 = slightly attacked
Rating 3 = severely attacked.

Rating was carried out after 100 double strokes with an acetone-impregnated cotton wool ball.

We claim:

1. A heat-curable coating material for cathodic electrocoating, which material is water-dilutable on protonation with an acid and contains
   (A) from 50 to 95% by weight of a polymer, polycondensate or polyadduct containing primary and/or secondary amino groups, as a binder, and
   (B) 5 to 50% by weight of a crosslinking agent obtained by reacting
      (a) a polyurethane with
      (b) formaldehyde or a formaldehyde-donating compound and
      (c) one or more secondary aliphatic amines.

2. The coating material of claim 1, containing a crosslinking agent (B), obtained using from 0.5 to 1.1 equivalents of (b) and from 0.5 to 1.1 equivalents of (c) per equivalent of polyurethane (a).

3. The coating material of claim 1, containing a component (B), obtained using a polyurethane (a) which has been prepared by reacting a polyisocyanate with an aliphatic or aromatic alcohol.

4. The coating material of claim 1, containing a component (B) having a polyurethane (a) which has been obtained from the reaction of trimerized hexamethylene diisocyanate with a substituted or unsubstituted phenol.

5. The coating material of claim 1, wherein components (A) and (B) have been partially reacted.

6. A coated article obtained using a coating material as defined in claim 1.

7. The heat-curable coating material of claim 1, wherein component (A) is present at from 60 to 80% by weight and component (B) is present at from 20 to 40% by weight.

* * * * *